E. ROWLEY & R. D. WILLIAMS.
ACETYLENE GAS GENERATOR.
APPLICATION FILED OCT. 11, 1911.
1,030,923.
Patented July 2, 1912.
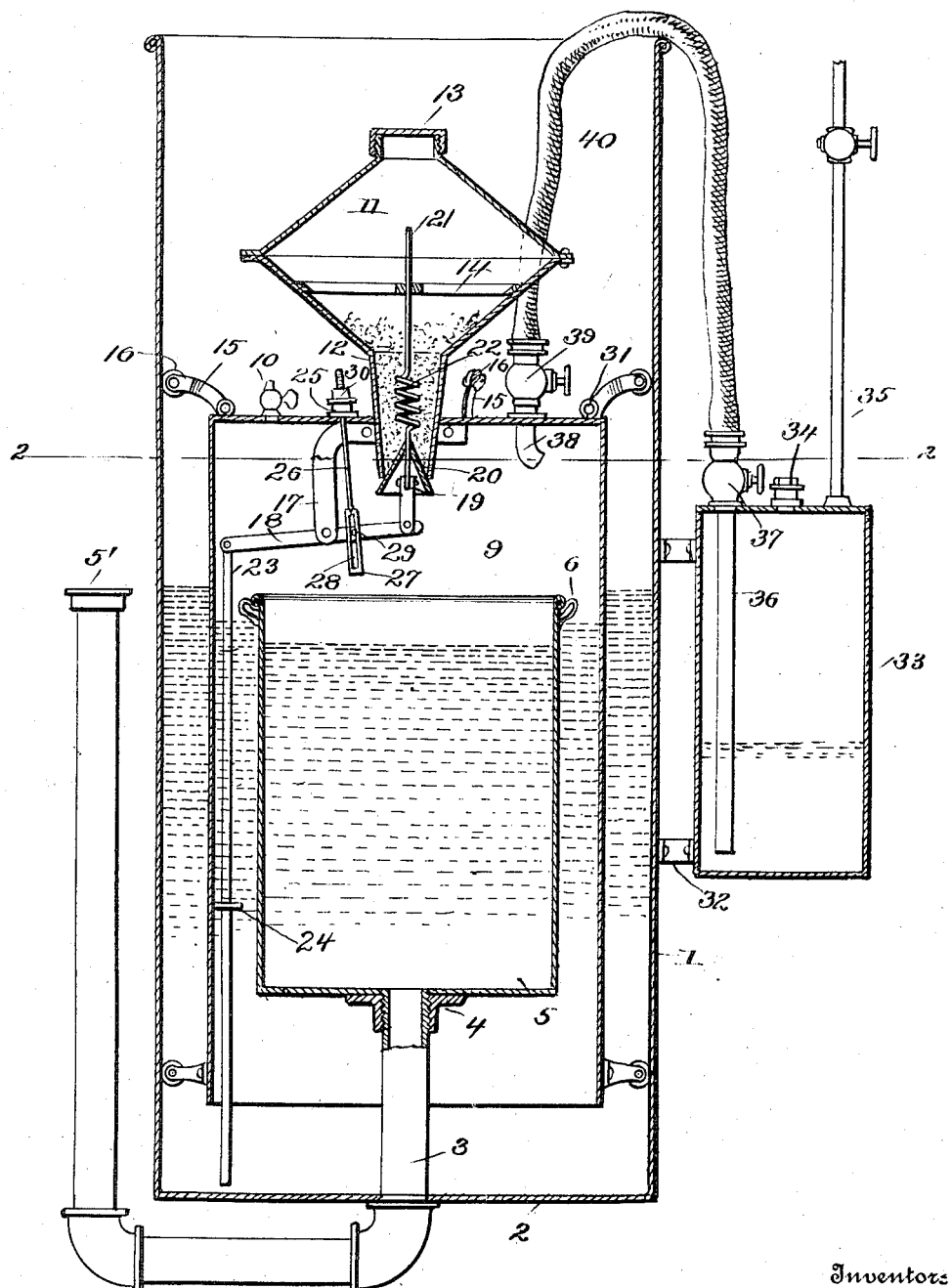
Witnesses
Inventors
R. D. Williams
E. Rowley
By
A. R. Stacy, Attorney.

UNITED STATES PATENT OFFICE.

EDWARD ROWLEY AND RODGER D. WILLIAMS, OF ALBIA, IOWA.

ACETYLENE-GAS GENERATOR.

1,030,923.  Specification of Letters Patent.  Patented July 2, 1912.

Application filed October 11, 1911. Serial No. 654,119.

*To all whom it may concern:*

Be it known that we, EDWARD ROWLEY and RODGER D. WILLIAMS, citizens of the United States, residing at Albia, in the county of Monroe and State of Iowa, have invented certain new and useful Improvements in Acetylene-Gas Generators, of which the following is a specification.

This invention relates to acetylene gas generators, and has for its object to provide a generator of simple structure in which the calcium carbid is automatically fed into a tank containing water when the gas in the generator has been consumed to a certain or predetermined degree. The generator also includes means for automatically checking the flow of calcium carbid when a quantity of gas has been generated.

With these and other objects in view, the generator includes structurally an outer tank containing water and in which a bell is mounted for vertical movement, with its lower portion immersed in the water. A second tank is arranged within the first mentioned tank and is inclosed within the bell. The last mentioned tank also contains water and is adapted to receive the calcium carbid from a hopper mounted upon the bell. Means for controlling the flow of the calcium carbid is carried by the bell and is operated from a stationary part of the apparatus as the said bell rises or falls.

For a full understanding of the invention reference is to be had to the following description and accompanying drawings, in which we have shown a vertical sectional view of the preferred form of the generator.

The generator consists of a tank 1 mounted upon a base 2, the said tank being open at its upper end and adapted to contain a volume of water. One end of a U-shaped pipe 3 passes through the bottom of the tank 1, and a plate 4 is screw threaded upon the inner end of the said pipe. A tank 5 is mounted upon the plate 4 and the outer end of the pipe 3 is closed by a cap 5'. The tank 5 is of considerably less diameter than the tank 1 and is adapted to contain a volume of water. The tank 5 is provided in the vicinity of its upper edge with handles 6. A bell 9 is located within the tank 1 and incloses the tank 5. The bell 9 is provided upon its top with an escape valve 10. A hopper 11 is mounted upon the bell 9 and is provided with a conical spout 12 which projects through the top of the said bell. The top of the hopper 11 is closed by a cap 13 which is screw threaded thereon. A cross bar 14 extends diametrically across the hopper 11 at the lower portion thereof. The bell 9 is provided in the vicinity of its upper and lower ends with outstanding arms 15 each of which carries a journaled roller 16, and the said rollers bear against the inner surface of the tank 1, whereby the said tank 1 serves as a guide for the bell 9.

Brackets 17 are clamped about the spout 12 under the top of the bell 9 and a lever 18 is fulcrumed between the lower ends of the said brackets. A stem 19 is pivoted to one end portion of the lever 18 and carries at its upper end a conical valve 20 which at times is adapted to close against the lower end of the spout 12. A rod 21 passes slidably through the cross bar 14 and is connected at its lower end with the valve 20 and stem 19 and just above the valve 20 is provided with a series of convolutions 22 which are located in the spout 12 and are adapted to prevent material from accumulating in the said spout and clogging the passageway therethrough.

In the form of the invention as illustrated the upper end of a rod 23 is pivoted to the end of the lever 18 opposite the end thereof that carries the stem 19 and the lower portion of the rod 23 is trained through a guide 24 which is attached to the inner side of the bell 9 and the lower end of the rod 23 is in the vicinity of the bottom of the tank 1. The rod 23 is of sufficient weight to hold the valve 20 normally closed against the spout 12. A nipple 25 is attached to the top of the bell 9 and a rod 26 passes slidably through the said nipple. A loop 27 is pivotally connected with the lower end of the rod 26 and is provided with an elongated slot 28 which receives a pin 29 carried by that end portion of the lever 18 upon which the stem 19 is mounted. A knob 30 is screw threaded upon the upper end of the rod 26 and bears against the upper end of the nipple 25. The bell 9 is provided upon its top with eyes 31 which may be engaged by a bail (not shown), whereby the bell may be lifted manually.

Brackets 32 are attached to the outer side of the tank 1 and support a receptacle 33. A detachable cap 34 closes the inlet opening of the receptacle 33. A service pipe 35 communicates with the interior of the receptacle 33 through the top thereof. A pipe 36 passes through the top of the receptacle 33 and extends down into the same and terminates short of the bottom thereof. At a point above the receptacle 33 the pipe 36 is provided with a valve 37. A pipe 38 passes through the top of the bell 9 and at a point above the top of the bell is provided with a valve 39. A flexible hose 40 connects the upper ends of the pipes 36 and 38 and the intermediate portion of the said hose passes through the upper edge of the tank 1.

In operation, a suitable quantity of water is placed in the tank 1 and tank 5 and a quantity of calcium carbid is placed in the hopper 11. When the hopper 11 is being charged with the calcium carbid, or previous thereto, the knob 30 is turned so that the rod 26 and loop 27 are moved longitudinally, whereby the lever 18 is swung so that the valve 20 is carried into close contact with the lower end of the spout 12 and thus the carbid cannot flow directly through the hopper 11 and spout 12. When it is desired to make gas, the knob 30 is turned so that the rod 26 and loop 27 are moved in a downward direction and thus the valve 20 may move away from the lower end of the spout 12. When the bell 9 descends to such an extent that the lower end of the rod 23 comes in contact with the bottom of the tank 1, the said rod is moved longitudinally, whereby the lever 18 is swung and the stem 19 and valve 20 are carried away from the lower end of the spout 12. Thus the carbid will flow by gravity through the spout 12 and precipitate into the water contained within the tank 5. This will generate the acetylene gas, the pressure of which will be sufficient to elevate the bell 9 and as the said bell moves in an upward direction the rod 23 will move in a downward direction through the guide 24, thereby swinging the lever 18, which, through the stem 19, will carry the valve 20 into engagement with the lower end of the spout 12 and the flow of calcium carbid is interrupted. The loop 27 with its elongated slot 28 receiving the pin 29 upon the lever 18 will limit the movement of the said lever 18 so that the valve 20 may be limited in its movement with relation to the lower end of the spout 12, whereby the quantity of calcium carbid permitted to pass through the said spout may be regulated.

As hereinbefore stated, the convolutions 22 provided in the rod 21 prevent the carbid from choking the passageway through the spout 12. When the valves 37 and 39 are opened the gas passes from under the bell 9 through the pipe 38, hose 40 and pipe 36 into the receptacle 33. The receptacle 33 contains a volume of water which is sufficient to close the lower end of the pipe 36. Therefore the gas must pass up through this water and is thereby washed, and any foreign matter that it will contain will remain in the bottom of the receptacle 33. From the receptacle 33 the gas may pass through the pipe 35 to the points where it is to be used. By closing the valve 39 the gas may be confined in the bell 9 while the receptacle 33 is being cleaned. By closing the valve 37 the gas will be confined in the bell 9 and pipe 40 while the receptacle 33 may be cleaned. By closing the valve 39 any gas that is in the pipe 30 and the receptacle 33 and pipe 35 may be confined in the said parts while the liquid in the tank 1 may be removed and the said tank cleaned and again replenished. The residuum that deposits upon the bottom of the tank 5 will pass down into the intermediate part of the pipe 3 and by removing the cap 5' and attaching a pump to the outer end of the said pipe this residuum may be pumped out of the pipe 3 and the lower portion of the tank 5. Again the volume of water in the tank 5 may be replenished by pouring the same into the outer portion of the pipe 3 after the cap 5' has been removed. When the generator is making gas the cap 5' is placed tightly over the outer end of the pipe 3.

Having thus described the invention, what is claimed as new is:

In an acetylene gas generator, the combination of inner and outer tanks, a bell movable freely within the outer tank and surrounding the inner tank, a hopper mounted upon the upper end of the bell and having a spout projecting through the top of the bell, brackets depending from the top of the bell, a lever fulcrumed between the said brackets, a valve carried by the inner end of the lever and adapted to normally close the end of the spout, the lever being operated by the descent of the bell to carry the valve from the spout and permit feeding of carbid to the generator, an adjustable rod mounted in the top of the bell, a slotted link carried by the lower end of said rod, and a lateral pin on the lever between the fulcrum thereof and the valve at the inner end thereof engaging the said slotted link.

In testimony whereof we affix our signatures in presence of two witnesses.

EDWARD ROWLEY. [L. S.]
RODGER D. WILLIAMS. [L. S.]

Witnesses:
WALLACE TAUNTON,
LAURA E. SNIDER.